(12) United States Patent
Taylor et al.

(10) Patent No.: US 6,622,640 B2
(45) Date of Patent: Sep. 23, 2003

(54) AIRLIFT PALLET FOR CONTAINER ROLL-IN/OUT PLATFORM (CROP)

(75) Inventors: Matthew W. Taylor, Manton, MI (US); Jerome F. Blazejak, Cadillac, MI (US); Walter R. Jennings, Traverse City, MI (US)

(73) Assignee: AAR Corp., Wood Dale, IL (US)

( * ) Notice: Subject to any disclaimer, the term of this patent is extended or adjusted under 35 U.S.C. 154(b) by 0 days.

(21) Appl. No.: 09/901,515

(22) Filed: Jul. 9, 2001

(65) Prior Publication Data

US 2002/0005150 A1 Jan. 17, 2002

Related U.S. Application Data

(60) Provisional application No. 60/218,429, filed on Jul. 14, 2000, now abandoned.

(51) Int. Cl.$^7$ ................................ B65D 19/38
(52) U.S. Cl. ............................ 108/55.5; 108/56.3
(58) Field of Search .................... 108/51.11, 55.5, 108/55.3, 55.1, 56.3; 410/83; 206/386

(56) References Cited

U.S. PATENT DOCUMENTS

| | | | | |
|---|---|---|---|---|
| 3,545,713 A | * | 12/1970 | Mowatt-Larssen | 410/83 |
| 4,049,135 A | * | 9/1977 | Glassmeyer | 108/55.1 |
| 4,537,540 A | * | 8/1985 | Boughton | 108/55.1 |
| 4,758,123 A | * | 7/1988 | Corompt | 108/57.13 |
| 5,810,186 A | * | 9/1998 | Lam | 108/55.1 |

OTHER PUBLICATIONS

M3 Flatrack, Container Roll–in/out Platform (CROP) pamphlet.
A Multi–Model Approach to Military Shipping, Defense Transportation Journal; Feb. 2000.
Model 132 SR Screwdown Rectractable Twistlock drawing, Buffers USA, Inc.

* cited by examiner

Primary Examiner—Lanna Mai
Assistant Examiner—Jerry A. Anderson
(74) Attorney, Agent, or Firm—Barnes & Thornburg

(57) ABSTRACT

An airlift pallet for securing a container roll-in/out platform and cargo thereon within an aircraft by an aircraft cargo handling system. The pallet includes a base for supporting the platform and its cargo. The base includes a plurality of mounting receptacles adapted to receive and retain a respective lock member. Each lock member is removably secured to the mounting receptacle by a removable pin. Each lock member includes a rotatable head that is adapted to be inserted into and secured to the platform. The lock members secure the platform and its cargo to the airlift pallet.

14 Claims, 11 Drawing Sheets

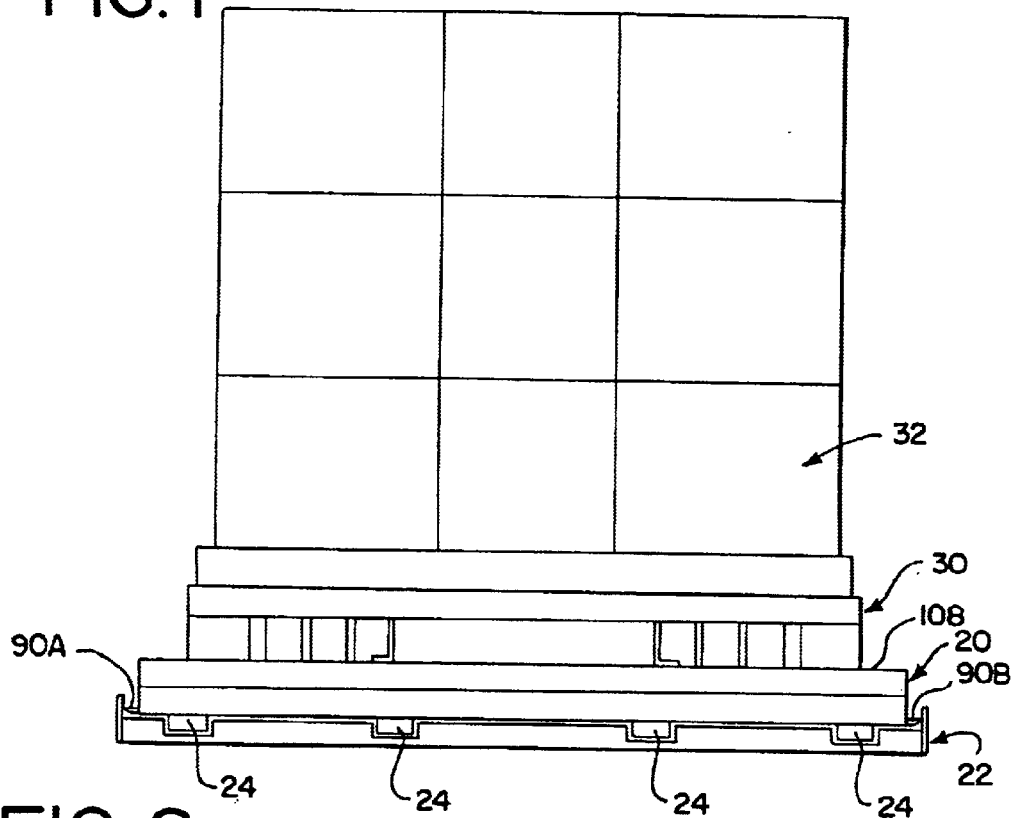
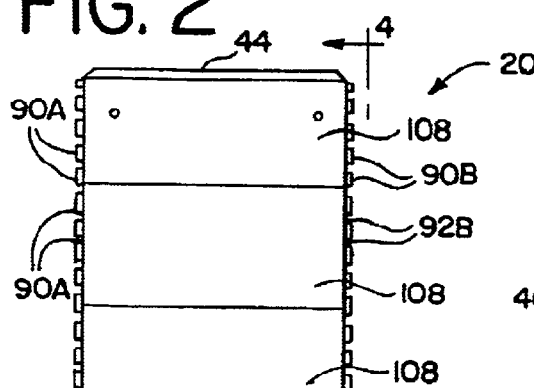
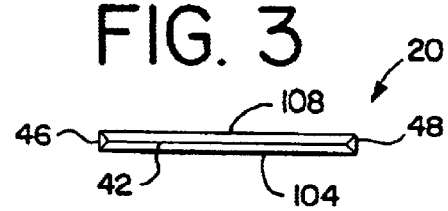
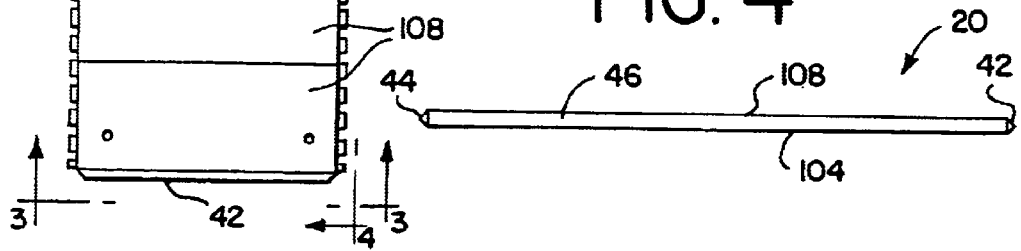

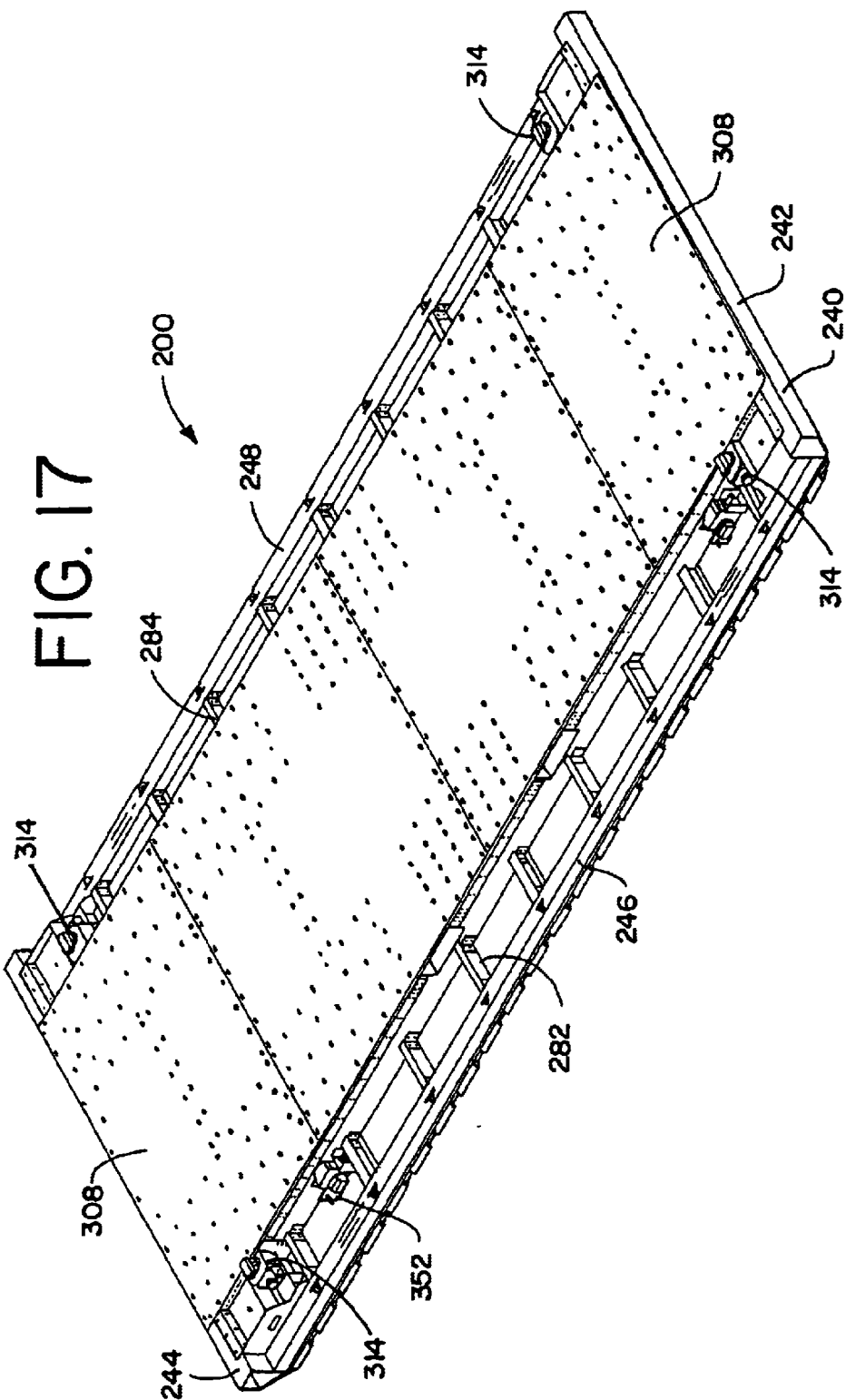

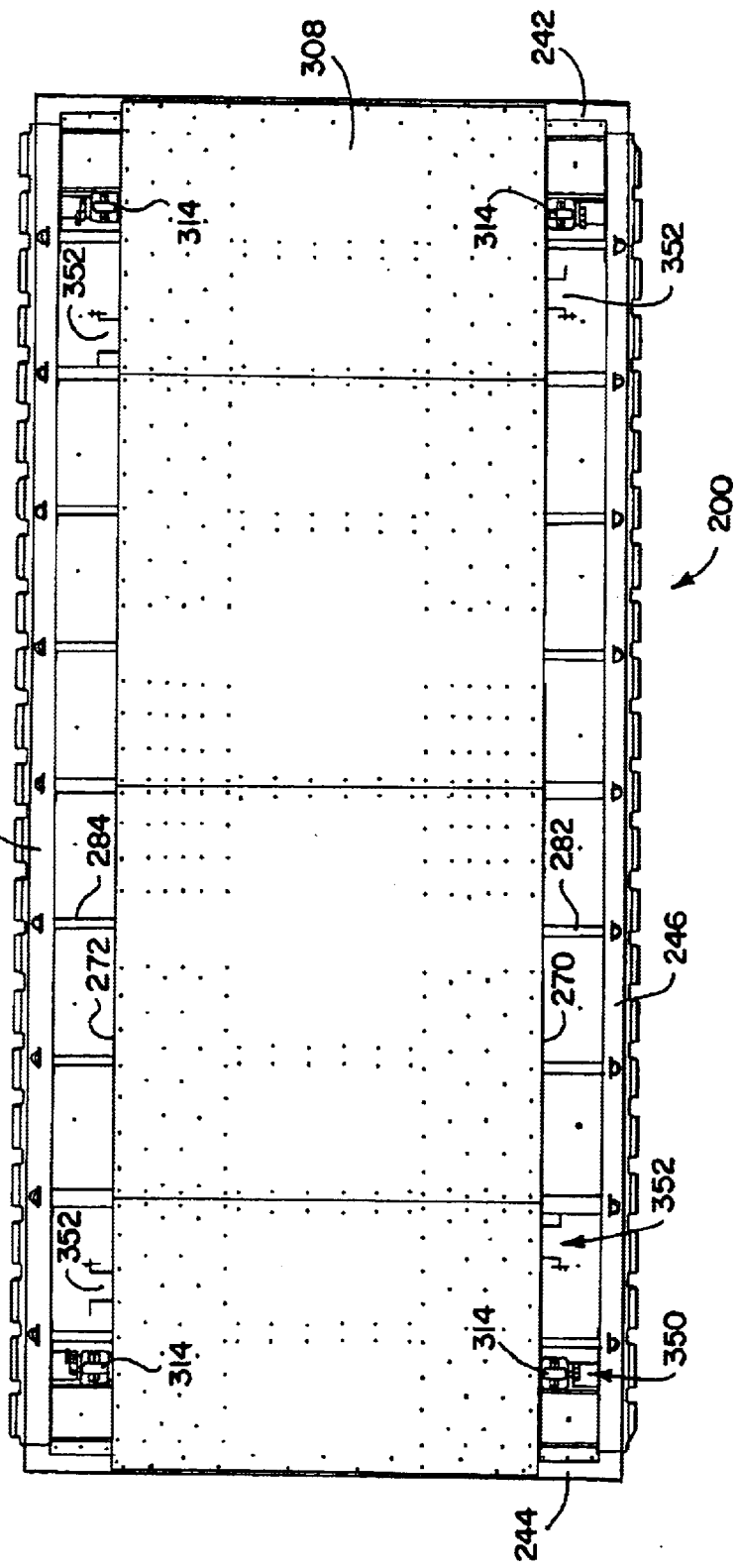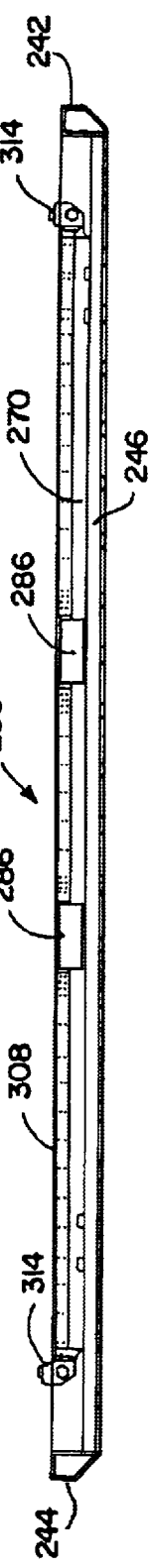

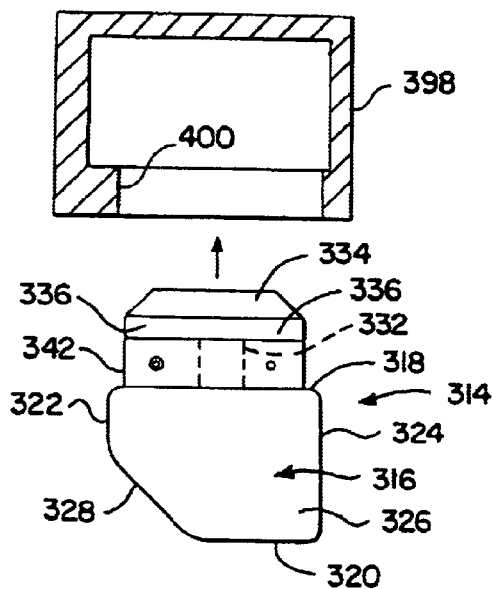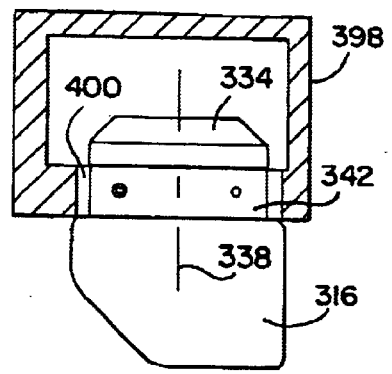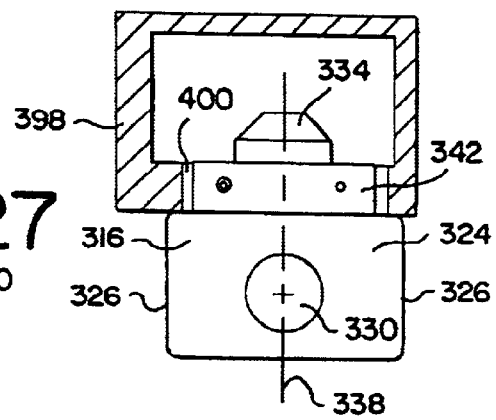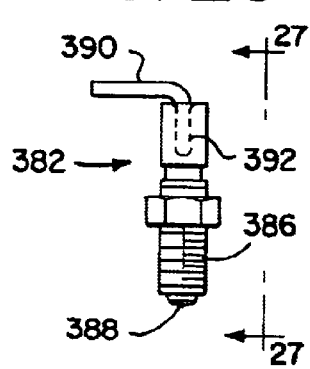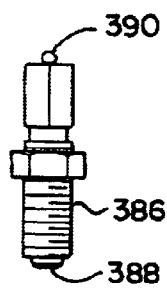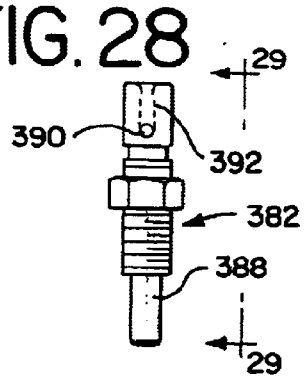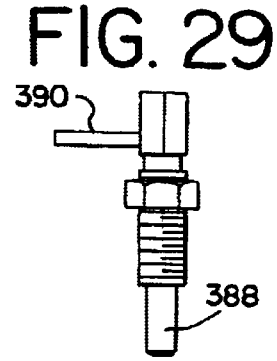

AIRLIFT PALLET FOR CONTAINER ROLL-IN/OUT PLATFORM (CROP)

RELATED APPLICATIONS

This application claims the benefit of U. S. Provisional Application No. 60/218,429, filed Jul. 14, 2000 now abandon.

BACKGROUND OF THE INVENTION

The present invention is directed to an airlift pallet that enables a Container Roll-In/Out Platform (CROP), and a load of cargo secured to the CROP, to be transported by a cargo aircraft.

A CROP is a NATO compatible flatrack that allows intermodal transport of all classes of supply. A CROP and its cargo may be secured within a standard twenty foot ISO container, or on palletized loading system (PLS) trucks or HEMTT-LHS trucks, for transport. The present invention enables a CROP and its cargo to be loaded into and secured within cargo aircraft equipped with the 463L cargo handling system for airlift transport.

SUMMARY OF THE INVENTION

An airlift pallet for securing a container roll-in/out platform within an aircraft by an aircraft cargo handling system. The pallet includes a generally rectangular base having a first support member and a second support member extending between a first end rail and a second end rail. The support members are adapted to support the platform. A plurality of mounting receptacles are attached to the base, one adjacent each corner. Each mounting receptacle includes a first bracket having a first aperture and a spaced apart second bracket having a second coaxially aligned aperture. The base also includes a plurality of storage receptacles. Each storage receptacle includes a first bracket having a first aperture and a spaced apart second bracket having a coaxially aligned second aperture. The pallet includes a plurality of lock members. Each lock member includes a housing having a bore, a head attached to the housing by a shaft, and a block extending around the shaft such that the block is rotatable with respect to the housing and the head. The head of the lock member is adapted to be inserted into a receptacle in the platform to secure the lock member to the platform. Each lock member is adapted to be inserted into a respective mounting receptacle such that the bore of the housing is aligned with the apertures in the brackets of the mounting receptacle. A locking pin is then inserted through the apertures and the bore to secure the locking member and the platform to the mounting receptacle and the pallet When not in use, the lock members may be stored in the storage receptacles by inserting the locking pin through the apertures in the mounting brackets of the storage receptacle and the bore of the housing. The base includes a plurality of tabs located on opposite sides of the base which are adapted to engage the aircraft cargo handling system.

BRIEF DESCRIPTION OF THE DRAWING FIGURES

FIG. 1 is a end view of the airlift pallet shown on the bed of a vehicle with a CROP and cargo attached to the pallet.

FIG. 2 is a top plan view of the pallet.

FIG. 3 is an end view taken along line 3—3 of FIG. 2.

FIG. 4 is a side elevational view taken along line 4—4 of FIG. 2.

FIG. 17 is a perspective view of the modified embodiment of the pallet.

FIG. 18 is a plan view of the modified embodiment of the pallet.

FIG. 19 is a side elevational view of the pallet of FIG. 18.

FIGS. 23–25 illustrate the insertion and locking of the twist lock to the pallet.

FIG. 26 is a side elevational view of a locking mechanism shown with the plunger in the retracted position.

FIG. 27 is a side elevational view of the locking mechanism taken along lines 27—27 of FIG. 26.

FIG. 28 is a side elevational view of the locking mechanism shown with the plunger in the extended position.

FIG. 29 is a side elevational view taken along line 29—29 of FIG. 28.

DETAILED DESCRIPTION OF THE PREFERRED EMBODIMENTS

The airlift pallet 20 of the present invention is shown in FIG. 1 located on the bed 22 of a vehicle such as a K-loader truck. The bed 22 includes a plurality of rotatable rollers 24 which rotatably support the pallet 20 such that the pallet 20 can be rolled onto, along or off the bed 22. The pallet 20 is adapted to support, and be removably attached to, a CROP (Container Roll-In-Out Platform) 30. The CROP 30 may be, for example, an M3 or M3A1 CROP. The CROP 30 is a standard piece of military equipment that includes a bottom surface adapted to be located on the ground, on a support structure or on a vehicle, and a top surface which is adapted to support various types of cargo 32 that is to be transported. The cargo 32 is secured to the CROP 30 for transport. The CROP 30 is sized to fit within a twenty foot standard ISO container. The CROP 30 includes a plurality of mounting members, each having a bottom mounting aperture, of the type that are used in ISO containers.

Figure 5:
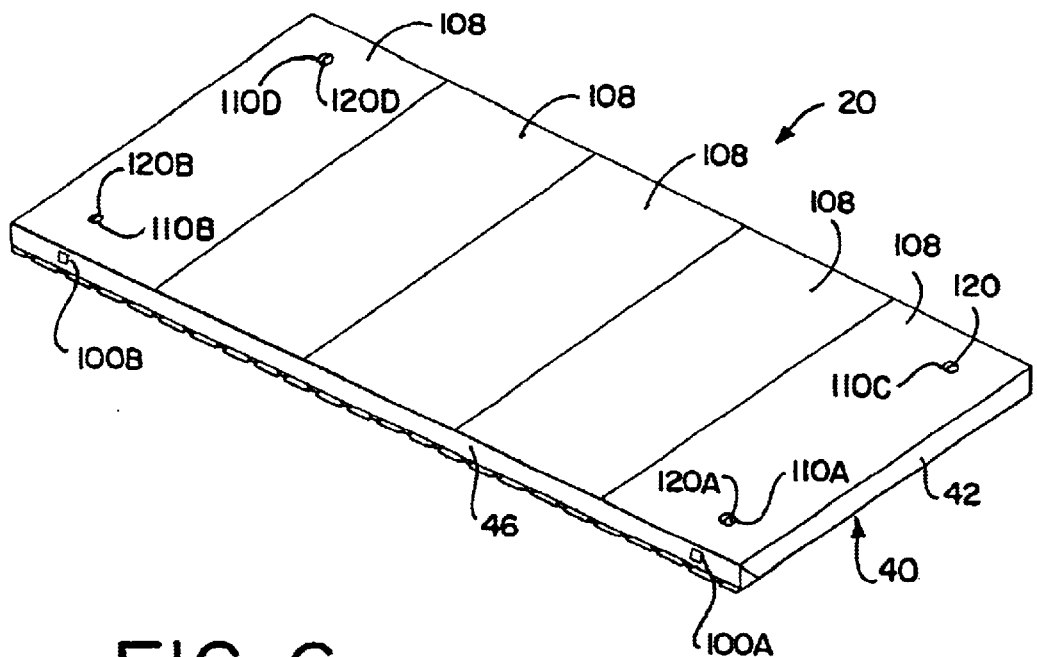
FIG. 5 is a perspective view of the pallet.
Figure 6:
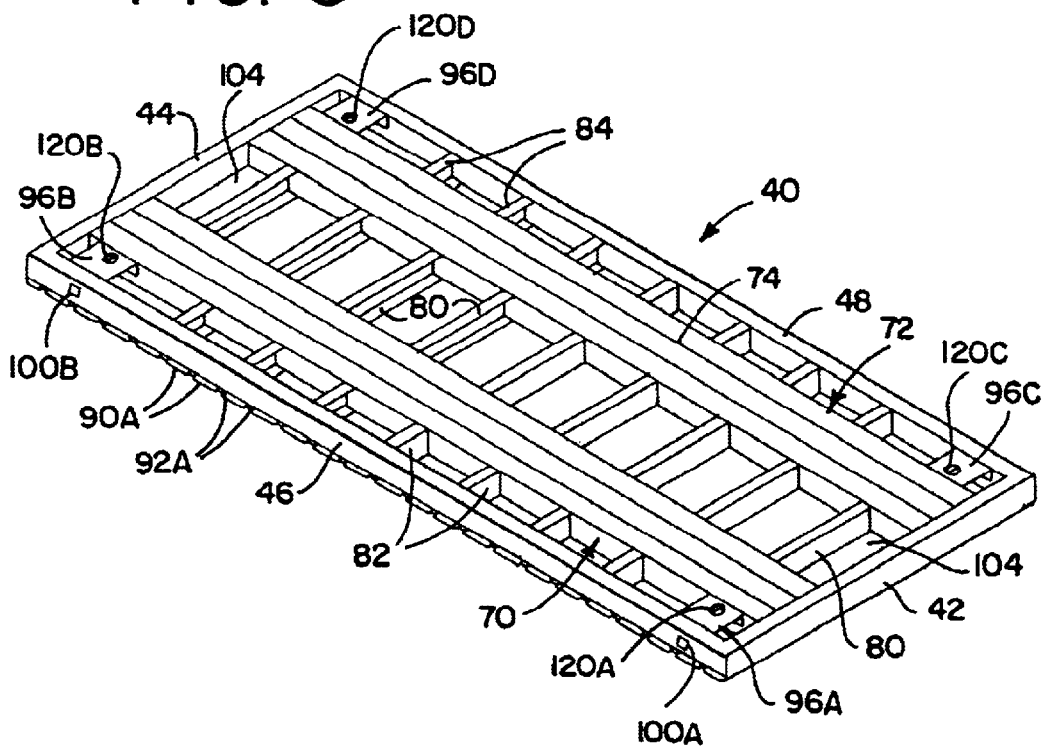
FIG. 6 is a perspective view of the pallet shown with the top plates removed.
Figure 7:
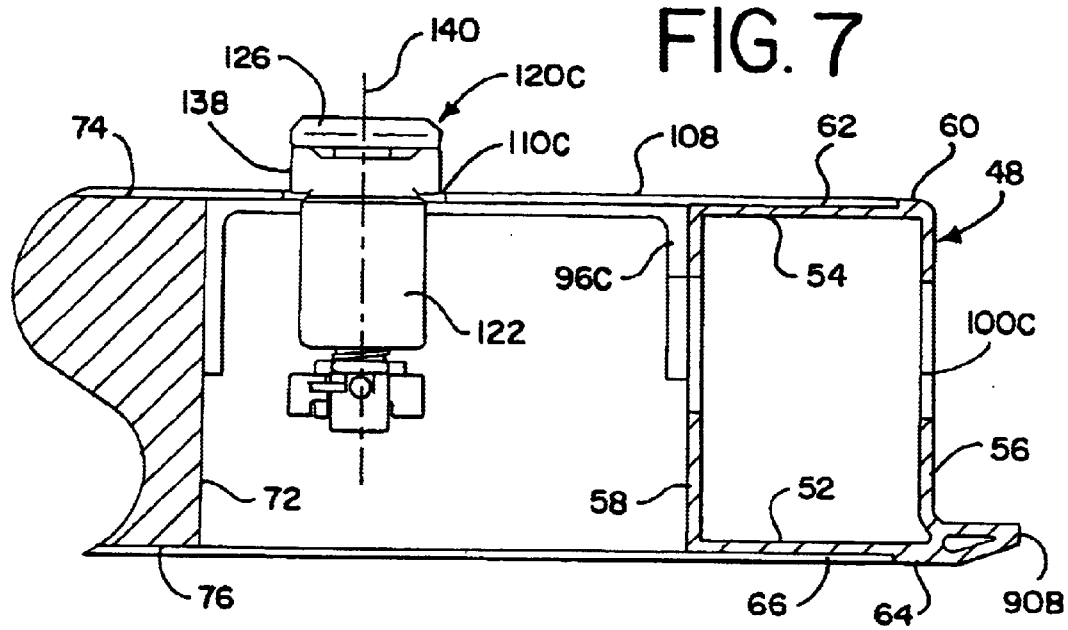
FIG. 7 is a partial cross-sectional view of the pallet showing one of the retractable twist locks in an extended and unlocked position.

As best shown in FIG. 6, the pallet 20 includes a generally rectangular base 40. The base 40 includes a generally linear first end rail 42 and a generally linear second end rail 44 that is spaced apart from and generally parallel to the first end rail 42. The base 40 also includes a generally linear first side rail 46 which extends between the ends of the end rails 42 and 44 and a generally linear second side rail 48 that extends between the opposite ends of the end rails 42 and 44. The first and second side rails 46 and 48 are spaced apart and generally parallel to one another. As best shown in FIG. 7, each rail 42, 44, 46 and 48 is a generally rectangular tube having a bottom wall 52, a top wall 54, a first side wall 56 and a second side wall 58. The top wall 54 includes an elongate upwardly extending lip 60 at its outer edge which forms a seat 62 on top of the top wall 54. The bottom wall 52 similarly includes an elongate downwardly extending lip 64 at its outer edge which forms a seat 66 on the bottom of the bottom wall 52. The lips 60 and 64 and the seats 62 and 66 extend around the perimeter of the base 40. The rails 42, 44, 46 and 48 may alternatively be constructed from generally C-shaped channels or other types of structural members, and may be formed as an extrusion.

The base 40 also includes a generally linear and elongate first support member 70 and a generally linear and elongate second support member 72 which is spaced apart from and generally parallel to the first support member 70. The support members 70 and 72 each have a first end attached to the first end rail 42 and a second end attached to the second end rail 44. Each support member 70 and 72 is formed from a plurality of elongate structural members such as generally rectangular tubes, beams and/or channels located side by side. Each support member 70 and 72 includes a generally planar top surface 74 which is generally co-planar with the seat 62 and a generally planar bottom surface 76 which is generally co-planar with the seat 66.

A plurality of brace members 80 are attached to and extend generally transversely between the first and second support members 70 and 72. The brace members 80 are located generally parallel to one another and are generally equally spaced apart from one another between the first end rail 42 and the second end rail 44. A plurality of brace members 82 are attached to and extend generally transversely between the first side rail 46 and the first support member 70. The brace members 82 are generally parallel to one another and are generally equally spaced apart from one another between the first and second end rails 42 and 44. A plurality of brace members 84 are attached to and extend generally transversely between the second side rail 48 and the second support member 72. The brace members 84 are generally parallel to one another and are generally equally spaced apart from one another between the first and second end rails 42 and 44. The brace members 80, 82 and 84 may be formed as generally C-shaped channels, beams, angles or the like.

The first side rail 46 includes a plurality of outwardly extending tabs 90A that are located along the length of the first side rail 46. A detent 92A is located between each adjacent pair of tabs 90A. The second side rail 48 includes a plurality of outwardly extending tabs 90B that are located along the length of the second side rail 48. A detent 92B is located between each adjacent pair of tabs 90B. The tabs 90A–B are located at the lower outside corner of the side rails 46 and 48. The tabs 90A–B and detents 92A–B are adapted to cooperate with the 463L cargo handling system used in cargo transport aircraft such that the cargo handling system can releasably secure the pallet 20 in place in the aircraft for transport.

The base 40 also includes brackets 96A–B which are attached to and extend between the first side rail 46 and the first support member 70. The brackets 96A–B are located at respective opposite ends of the first side rail 46 and first support member 70 adjacent the end rails 42 and 44. The base 40 also includes brackets 96C–D which are attached to and extend between the second side rail 48 and the second support member 72. The brackets 96C–D are located respectively at opposite ends of the second side rail 48 and second support member 72 adjacent the end rails 42 and 44. The brackets 96A–D are generally respectively located at each corner of the base 40. Each bracket 96A–D may be formed from a generally C-shaped channel, a planar or L-shaped plate or the like. The first side rail 46 includes a plurality of openings 100A–B which extend through the first side rail 46 to provide hand access to the space between the first side rail 46 and the first support member 70 and respectively below each bracket 96A–B. The second side rail 48 similarly includes a plurality of openings 100C–D which provide hand access to the space between the second side rail 48 and the second support member 72 and respectively beneath the brackets 96C and D.

The pallet 20 includes one or more base plates 104 that extend transversely between the lips 64 of the first side rail 46 and the second side rail 48 and that extend longitudinally between the lips 64 of the first end rail 42 and the second end rail 44. The base plates 104 are located within the seats 66 of the first and second end rails 42 and 44 and of the first and second side rails 46 and 48 such that the bottom surfaces of the base plates 104 are substantially planar and flush with the bottom of the lip 64. The base plates 104 are attached to the base 40 by welding or by fasteners such as rivets or threaded bolts or screws. The base plates 104 may be removably attached to the base 40 by fasteners such that a damaged or worn base plate 104 can be removed and replaced.

The pallet 20 also includes one or more top plates 108 which extend transversely between the lips 60 of the first side rail 46 and the second side rail 48 and that extend longitudinally between the lips 60 of the first end rail 42 and second end rail 44. The top plates 108 are located within the seats 62 of the end rails 42 and 44 and side rails 46 and 48. The top surfaces of the top plates 108 are substantially planar and flush with the top of the lip 60. The top plates 108 that are located at each end of the pallet 20 include a plurality of apertures 110A–D positioned respectively above each bracket 96A–D. The top plates 108 are attached to the base 40 by welding or by fasteners such as rivets or threaded bolts or screws. The top plates 108 may be removably attached to the base 40 by fasteners such that a damaged or worn top plate 108 can be removed and replaced. The base plates 104 and the top plates 108 can be formed respectively as a single unitary plate or in a plurality of sections. The base 40, base plates 104 and top plates 108 of the pallet 20 are preferably made from structural aluminum.

The pallet 20 includes a plurality of retractable twist locks 120A–D. Each twist lock 120A–D is respectively attached to a bracket 96A–D of the base 40 in alignment with an aperture 110A–D in the top plate 108. The retractable twist locks 120A–D are located so as to be positioned below a respective ISO mounting aperture on the CROP 30 when the CROP 30 is located for transport on the top plate 108 of the pallet 20. The apertures 110A–D provide hand access to the twist locks 120A–D.

Figure 8:
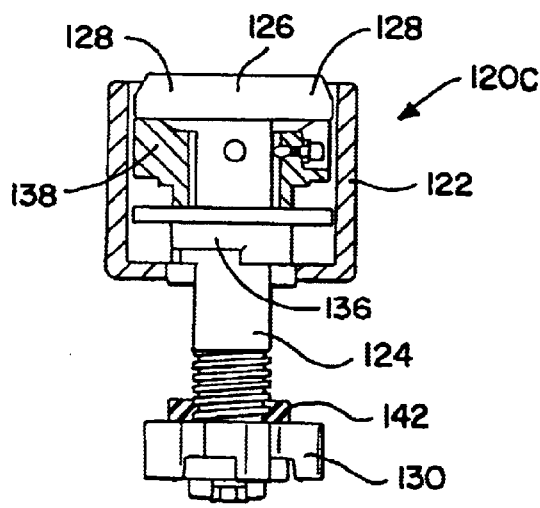
FIG. 8 is a partial cross-sectional view of a twist lock shown in a retracted position.
Figure 9:
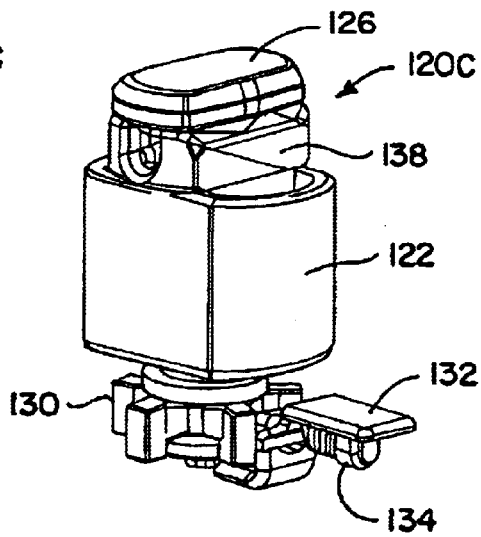
FIG. 9 is a perspective view of a twist lock shown in the extended and unlocked position.
Figure 10:
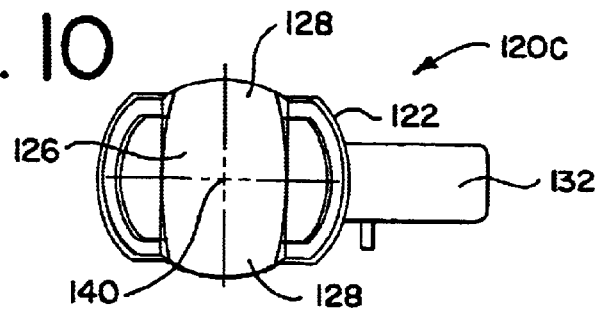
FIG. 10 is a top plan view of a twist lock shown in the extended and unlocked position.

The retractable twist lock 120C as shown in FIG. 7 is shown in greater detail in FIGS. 8–10. The twist lock 120C includes a housing 122 which is adapted to be attached to the bracket 96C. A shaft 124 extends through the bottom of the housing 122. The top end of the shaft 124 includes a head 126 attached to one end of the shaft 124 having outwardly extending wings 128. The opposite bottom end of the shaft 124 is threaded. A nut 130 is threadably attached to the threaded bottom end of the shaft 124. The nut 130 includes a plurality of detents. A handle 132 is attached to the bottom end of the shaft 124. The handle 132 includes a spring biased latch pin 134 which is adapted to be selectively located within a detent of the nut 30. A guide plate 136 extends around the shaft 124 within the housing 122. A shear block 138 extends around the shaft 124 such that the shaft 124 is rotatable about its central axis 140 with respect to the shear block 138. A bushing 142 extends around the shaft 124 and is located above the nut 130.

As shown in FIG. 8, the shaft 124 of the twist lock 120C is in a retracted position such that the head 126 of the shaft 124 is substantially located within the housing 122. The top of the head 126 is thereby located substantially flush with, or below, the top surface of the top plate 108 such that the twist lock does not interfere with loading or unloading of the CROP 30. As shown in FIGS. 9 and 10, the shaft 124 is located in the extended position with the head 126 located in the unlocked position. As shown in FIGS. 7, 9 and 10, the shear block 138 is located above the top edge of the housing 122 and has been rotated by the handle 132 ninety degrees from its retracted position as shown in FIG. 8. When the shaft 124 is in the extended position as shown in FIGS. 7, 9 and 10, the head 126 is located above the top plate 108 and is adapted to be inserted through the ISO mounting aperture in the CROP 30. The head 126 can then be rotated by hand about its axis 140 such that the wings 128 are adapted to engage the CROP 30. The nut 130 is then rotated to engage the housing 122 and thereby secure the head 126 of the shaft 124 in engagement with the CROP 30. The latch pin 134 prevents inadvertent rotation of the nut 130 with respect to the shaft 124. The latch pin 134 may provide ratcheting movement of the nut 130 in a selected direction of rotation, and may be manually pulled outwardly to allow free spinning of the nut 130. The shaft 124 thereby removably secures the CROP 30 and the cargo 32 to the pallet 20 to prevent horizontal and vertical movement of the CROP 30 with respect to the pallet 20 during transport. The retractable twist locks 120A, B, and D are constructed and operate in the same manner as the lock 120C. A preferred retractable twist lock is the Model 1132 screw down retractable twist lock as manufactured by Buffers U.S.A., Inc.

Figure 11:
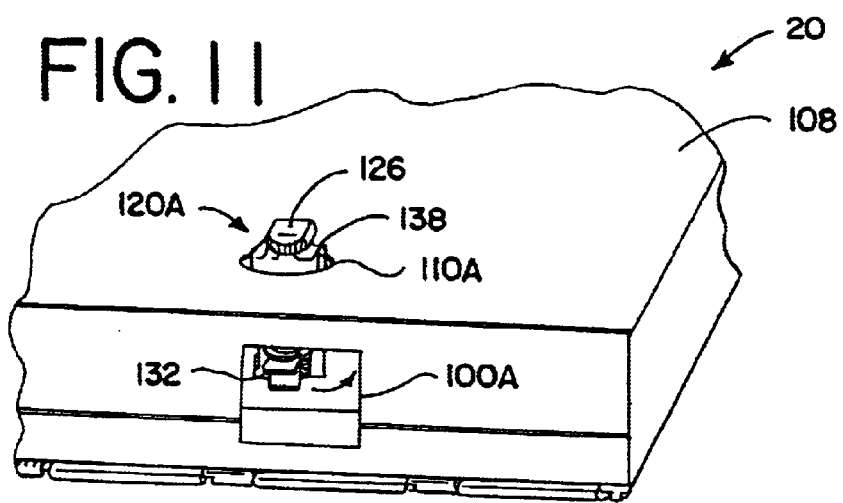
FIGS. 11–13 illustrate the unlocking and retraction sequence of a twist lock.
Figure 12:
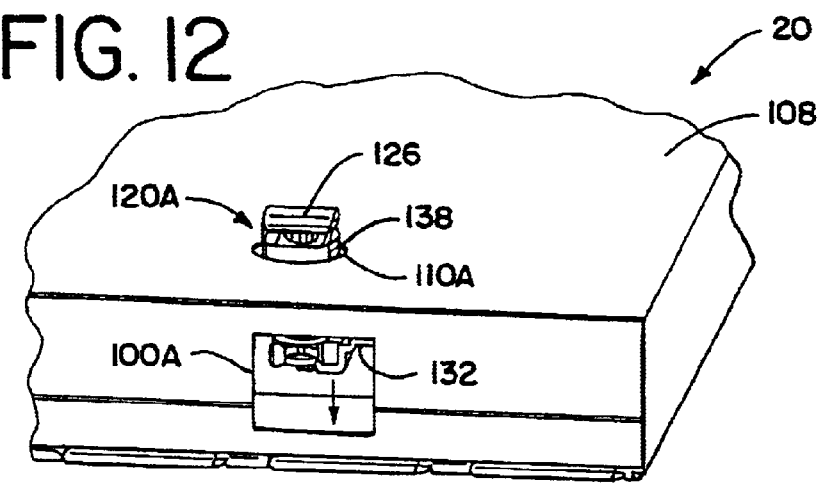
Figure 13:
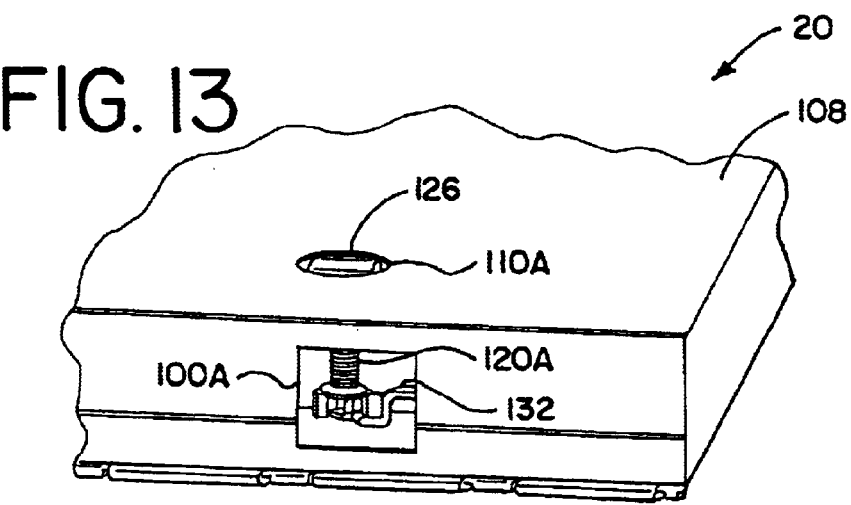

FIGS. 11–13 illustrate the retraction sequence of the retractable twist lock 120A. As shown in FIG. 11, the twist lock 120A is in the extended and locked position. In the locked position the head 126 is rotated ninety degrees with respect to the shear block 138. When the twist lock 120A is in the extended and locked position as shown in FIG. 11 the twist lock 120A is adapted to secure a CROP 30 to the pallet 20. As shown in FIG. 12, the handle 122 of the twist lock 120A has been rotated ninety degrees from its position as shown in FIG. 11 thereby rotating the shaft 124 and the head 126 ninety degrees with respect to the shear block 138. As shown in FIG. 12, the twist lock 120A is in the extended and unlocked position. The twist lock 120A is then moved downwardly along the axis 140 to the retracted position as shown in FIG. 13 wherein the head 126 is located substantially flush with or below the top surface of the top plate 108. The retractable twist locks 120C–D are retracted in the same manner. The twists locks 120A–D are moved from the retracted position as shown in FIG. 13 to the extended and locked position as shown in FIG. 11 in a reverse sequence.

The first support member 70 and the second support member 72 are adapted to support the top plate 108 in the areas where the slide rails or rollers of the CROP 30 engage the top plates 108. The CROP 30 may be rolled or slid onto the pallet 20, or may be lifted onto the pallet by a fork truck or hoist. The pallet 20 may be located on the ground or on a truck such as a K-loader during the loading and unloading of the CROP 30 from the pallet 20. The base plates 104 assure adequate distribution of the weight of the pallet 20, CROP 30 and cargo 32 to the transport vehicle during loading, unloading and restraint conditions.

Figure 14:
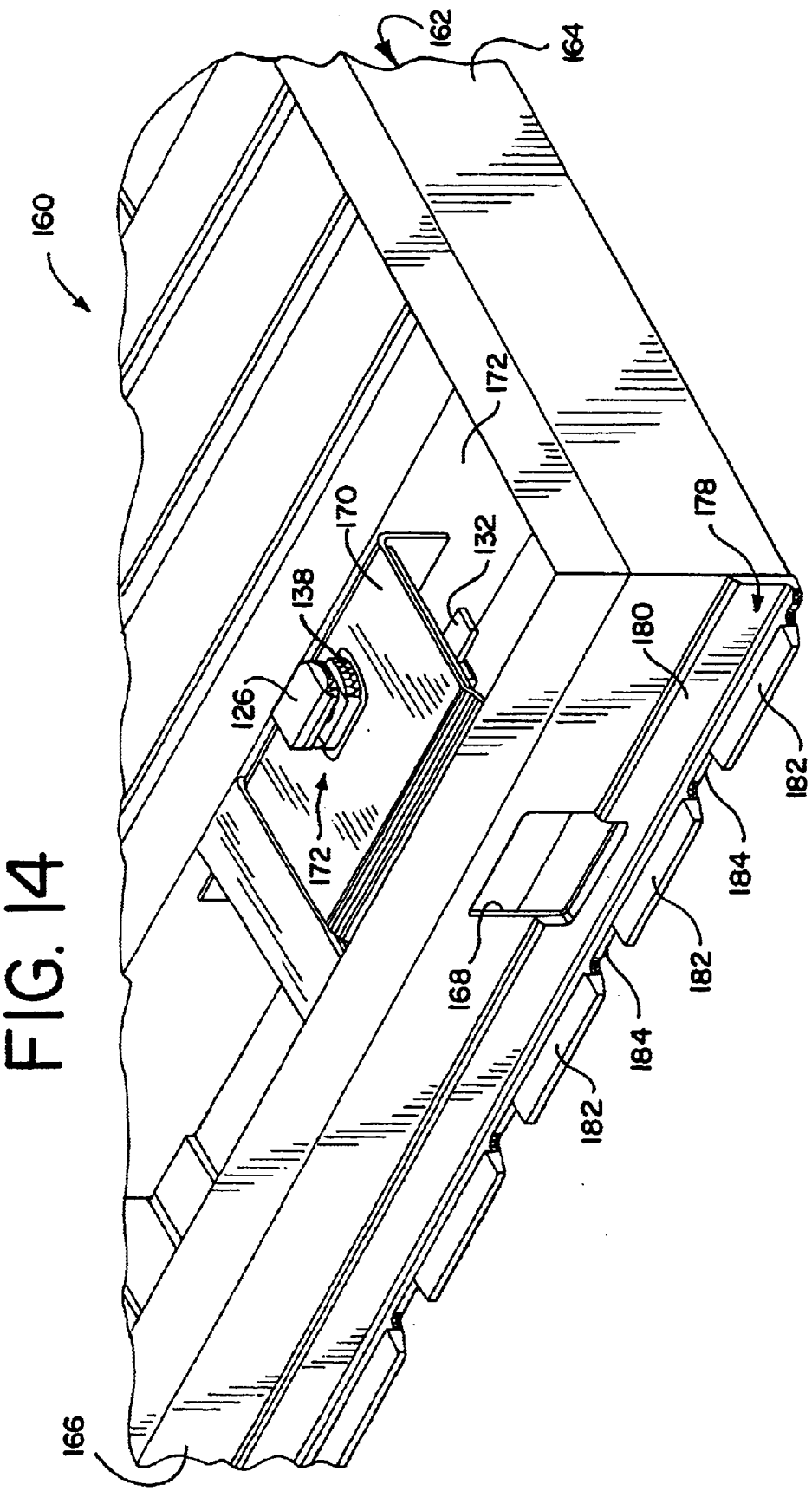
FIG. 14 is a partial perspective view of a modified embodiment of the airlift pallet shown with the top plates removed.
Figure 15:
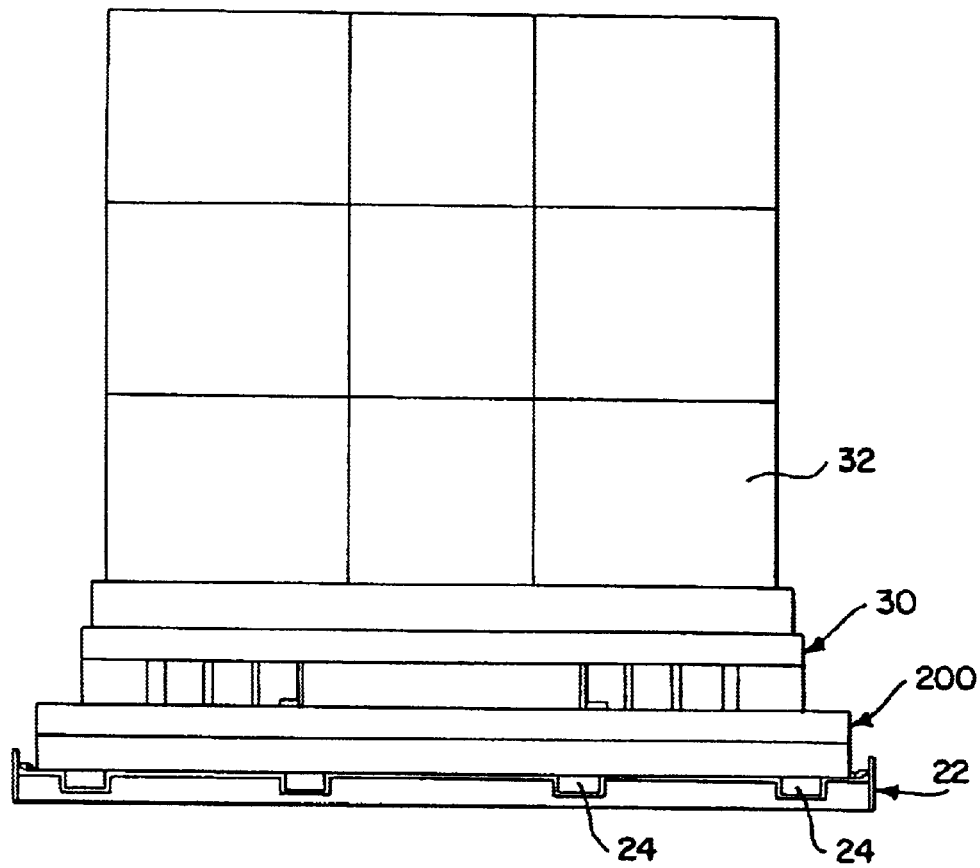
FIG. 15 is an end view of a further modified embodiment of the airlift pallet shown on the bed of a vehicle with a CROP and cargo attached to the pallet.
Figure 16:
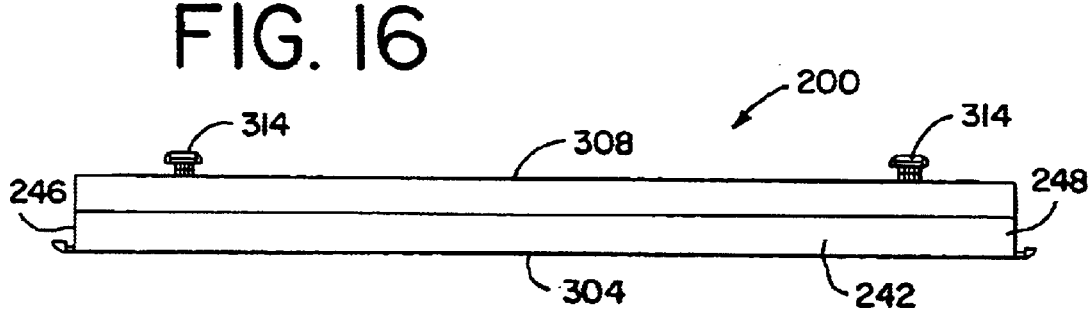
FIG. 16 is an end view of the modified embodiment of the pallet.

FIG. 14 shows a modified embodiment of the airlift pallet identified with reference number 160. The pallet 160 includes top plates and bottom plates as does the pallet 20. As shown in FIG. 14, the top plates have been removed from the pallet 160. The pallet 160 includes a base 162 having end rails 164 and side rails 166 that are formed from generally C-shaped channel members. Each side rail 166 includes a plurality of openings 168. A generally L-shaped bracket 170 is attached to each side rail 166 and to a support member 172 adjacent each opening 168. The bracket 170 may alternatively be a generally C-shaped channel member, beam or other structural member. A twist lock 172 is respectively attached to each bracket 170. The twist locks 172 are identical to the twist locks 120A–D and similar parts are indicated with the same reference numbers. The openings 168 provide hand access to the nut 130, handle 132 and shaft 124 of the twist lock to enable manual operation thereof.

The base 162 includes an elongate detent rail 178 attached to the bottom edge of each side rail 166. The detent rails 178 extend from end to end of the side rails 176. The detent rail 178 is generally L-shaped in cross section having an upstanding leg 182 which is adapted to be removably attached to the side rail 166 by fasteners such as threaded bolts or screws. The detent rail 178 also includes a plurality of tabs 182 which are spaced along the length of the detent rail 178 and which project outwardly from the bottom end of the upstanding leg 180. A detent 184 is located between each adjacent pair of tabs 182. The tabs 182 and detents 184 of the detent rail 178 are adapted to operate in cooperation with the 463L cargo handling system of cargo transport aircraft to releasably secure the pallet 160 in place within the aircraft for transport. If one or more of the tabs 182 become worn or damaged, the detent rail 178 can be removed and replaced with a new detent rail. The detent rail 178 that is attached to each side rail 166 may be formed in a plurality of sections if desired. The detent rails 178 may be used, if desired, in place of the integral tabs 90A–D of the first and second side rails 46 and 48 of the pallet 20.

Figure 20:
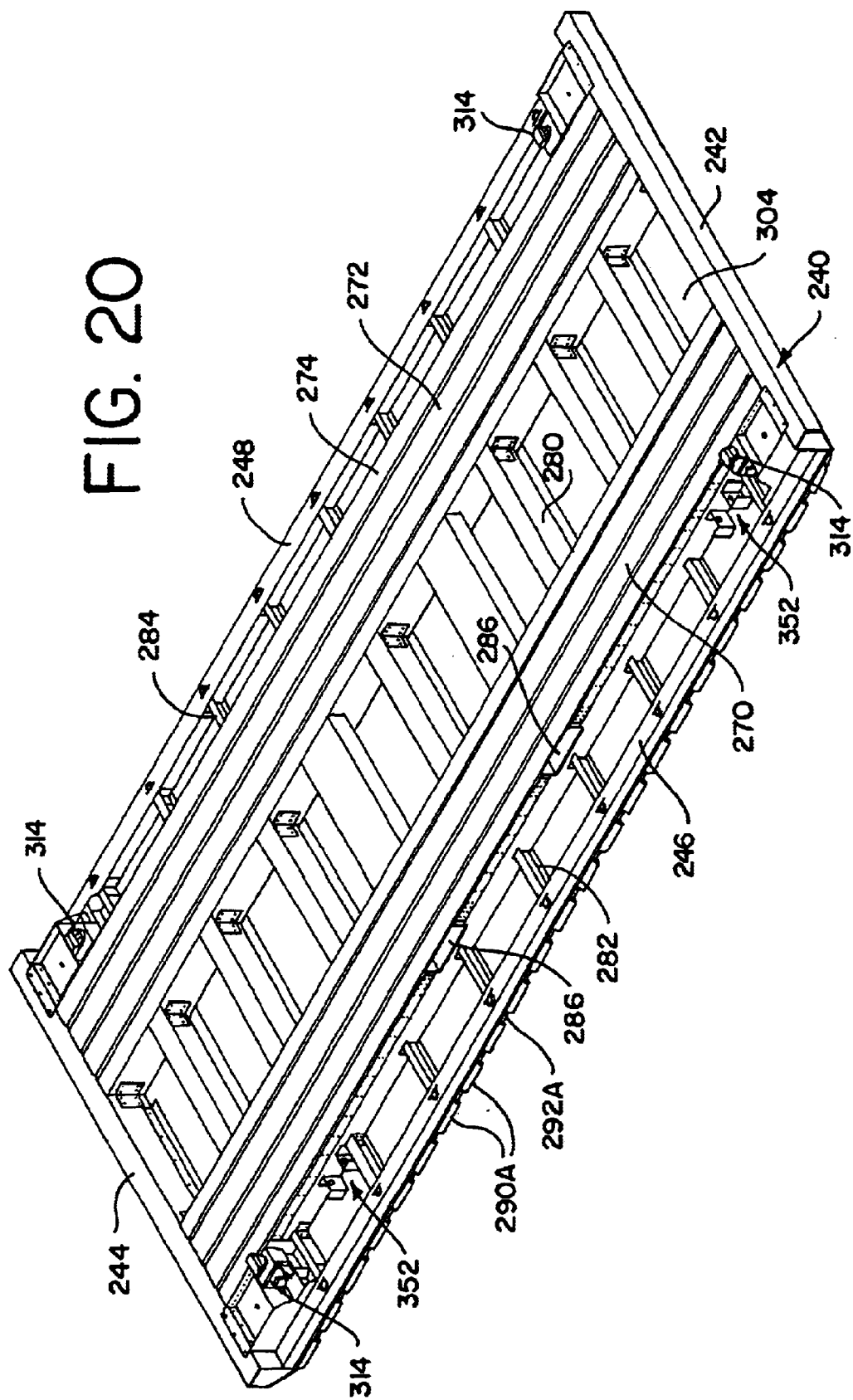
FIG. 20 is a perspective view of the modified embodiment of the pallet with the top plates removed.
Figure 21:
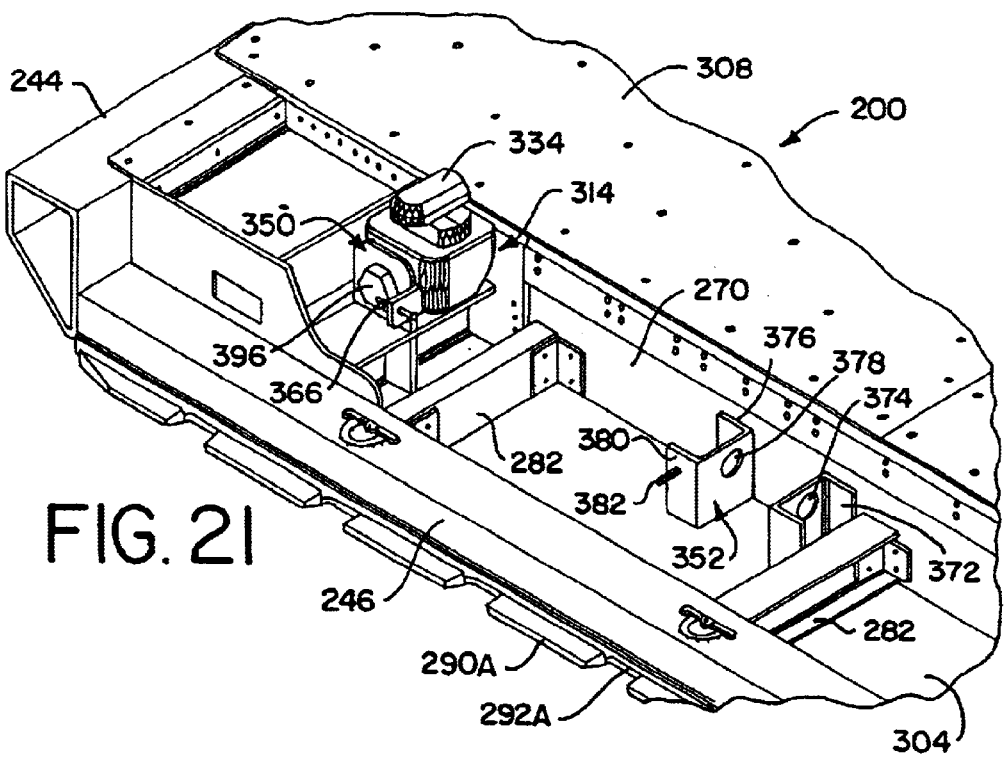
FIG. 21 is partial perspective view of the modified embodiment of the pallet showing a twist lock in its operational and locked position.
Figure 22:
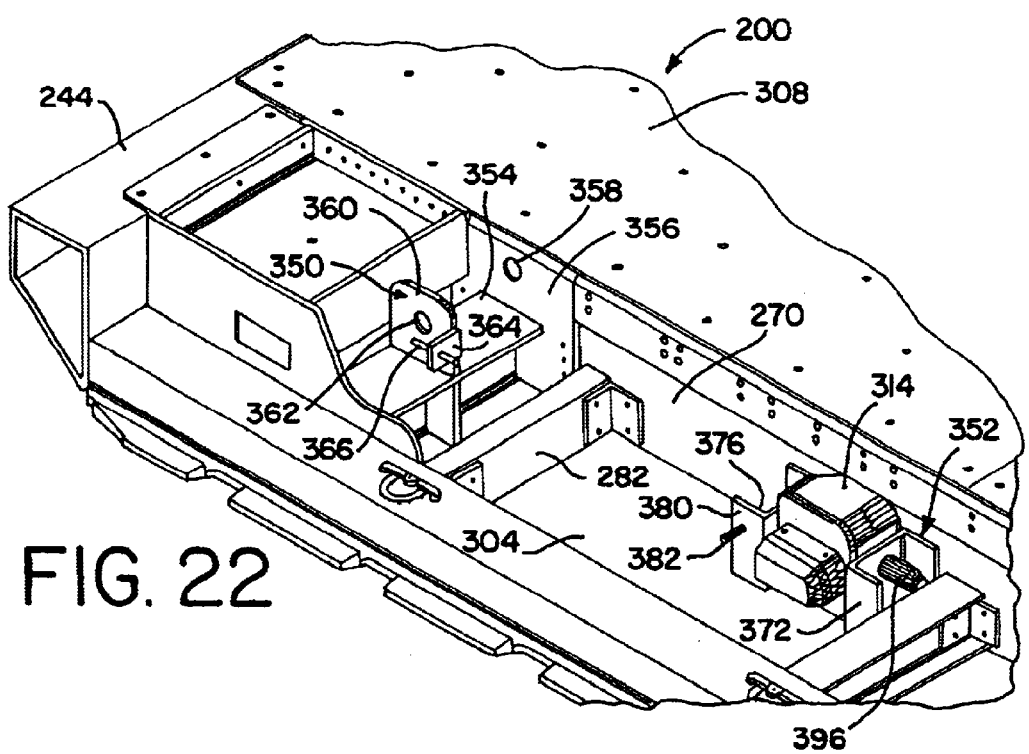
FIG. 22 is a partial perspective view of the modified embodiment of the pallet with a twist lock shown in its stored position.

Another modified embodiment of the airlift pallet is shown in FIGS. 15–29 and is designated with the reference number 200. As best shown in FIGS. 17 and 20, the pallet 200 includes a generally rectangular base 240. The base 240 includes a generally linear first end rail 242 and a generally linear second end rail 244 that is spaced apart from and generally parallel to the first end rail 242. The end rails 242 and 244 each include an inclined wall to assist in loading the pallet 200. The base 240 also includes a generally linear first side rail 246 which extends between the ends of the end rails 242 and 244 and a generally linear second side rail 248 that extends between the opposite ends of the end rails 242 and 244. The first and second side rails 246 and 248 are spaced apart and generally parallel to one another. Each rail 242, 244, 246 and 248 is a generally rectangular tube having a bottom wall, a top wall, a first side wall and a second side wall. The rails 242, 244, 246 and 248 may alternatively be constructed from generally C-shaped channels or other types of structural members, and may be formed as an extrusion. A plurality of cargo tie down D-rings are located along the length of each side rail 246 and 248. The side rails 246 and 248 also include lifting rings for hoisting the pallet 20.

The base 240 also includes a generally linear and elongate first support member 270 and a generally linear and elongate second support member 272 which is spaced apart from and generally parallel to the first support member 270. The support members 270 and 272 each have a first end attached to the first end rail 242 and a second end attached to the second end rail 244. Each support member 270 and 272 is formed from a plurality of elongate structural members such as generally rectangular tubes, beams and/or channels located side by side. Each support member 270 and 272 includes a generally planar top surface 274 and a generally planar bottom surface. The support members 270 and 272 support the rollers on the CROP 30 during insertion of the CROP 30 from the truck to the pallet 20 and during extraction of the CROP 30 from the pallet 20 to the truck.

A plurality of brace members 280 are attached to and extend generally transversely between the first and second support members 270 and 272. The brace members 280 are located generally parallel to one another and are generally equally spaced apart from one another between the first end rail 242 and the second end rail 244. A plurality of brace members 282 are attached to and extend generally transversely between the first side rail 246 and the first support member 270. The brace members 282 are generally parallel to one another and are generally equally spaced apart from one another between the first and second end rails 242 and 244. A plurality of brace members 284 are attached to and extend generally transversely between the second side rail 248 and the second support member 272. The brace members 284 are generally parallel to one another and are generally equally spaced apart from one another between the first and second end rails 242 and 244. The brace members 280, 282 and 284 may be formed as generally C-shaped channels, beams, angles or the like. A pair of spaced apart openings 286 extend through each support member 270 and 272. The openings 286 are adapted to receive the forks of a fork lift truck.

The first side rail 246 includes a plurality of outwardly extending tabs 290A that are located along the length of the first side rail 246. A detent 292A is located between each adjacent pair of tabs 290A. The second side rail 248 includes a plurality of outwardly extending tabs 290B that are located along the length of the second side rail 248. A detent 292B is located between each adjacent pair of tabs 290B. The tabs 290A–B are located at the lower outside corner of the side rails 246 and 248. The tabs 290A–B and detents 292A–B are adapted to cooperate with the 463L cargo handling system used in cargo transport aircraft such that the cargo handling system can releasably secure the pallet 200 in place in the aircraft for transport.

The pallet 200 includes one or more base plates 304 that extend transversely between the first side rail 246 and the second side rail 248 and that extend longitudinally between the first end rail 242 and the second end rail 244. The base plates 304 are attached to the base 240 by welding or by fasteners such as rivets or threaded bolts or screws. The base plates 304 may be removably attached to the base 240 by fasteners such that a damaged or worn base plate 304 can be removed and replaced.

The pallet 200 also includes one or more top plates 308 which extend transversely between the first side rail 246 and the second side rail 248 and that extend longitudinally between the end rail 242 and second end rail 244. The top surfaces of the top plates 308 are substantially planar. The top plates 308 are attached to the base 240 by welding or by fasteners such as rivets or threaded bolts or screws. The top plates 308 may be removably attached to the base 240 by fasteners such that a damaged or worn top plate 308 can be removed and replaced. The base plates 304 and the top plates 308 can be formed respectively as a single unitary plate or in a plurality of sections. The base 240, base plates 304 and top plates 308 of the pallet 200 are preferably made from structural aluminum.

The pallet 200 includes a plurality of twist lock members 314. A twist lock 314 is positioned in each corner of the pallet 200, such that the pallet 200 includes four twist locks. Each twist lock 314, as best shown in FIGS. 23 and 25, includes a housing 316. The housing 316 includes a generally planar top wall 318, bottom wall 320, front wall 322, rear wall 324, and a pair of side walls 326. An inclined wall 328 extends at an inclined angle between the bottom wall 320 and the front wall 322. A generally cylindrical bore 330 extends through the housing 316 from the rear wall 324 to the front wall 322. A shaft 332 extends upwardly from the top wall 318 of the housing 316. A head 334 is attached to the top end of the shaft 332. The head 334 includes outwardly extending wings 336 which extend outwardly from the shaft 332 in opposite directions relative to one another. The shaft 332 includes a central axis 338. A shear block 342 extends around the shaft 332 such that the housing 316, shaft 332 and head 334 are selectively rotatable about the axis 338 with respect to the shear block 342. The shear block 342 may be made of two general C-shaped collars that are fastened to one another. When viewed in plan, the head 334 and shear block 342 have approximately the same width and length dimensions and their length is substantially greater than their width. Each twist lock 314 includes a locking pin 396 having a head and generally cylindrical shank.

The pallet 200 includes a plurality of mounting receptacles 350, one mounting receptacle 350 is located adjacent each corner of the pallet 200. Each mounting receptacle 350 is adapted to receive and retain a twist lock 314. The pallet 200 also includes a plurality of storage receptacles 352, one storage receptacle being located adjacent each corner of the pallet 200. Each storage receptacle 352 is adapted to receive and retain a twist lock 314 when the twist lock is placed in its stored and non-operational position. The mounting receptacle 350 includes a shelf 354 that is supported above the base plate 304, a first bracket 356 having a generally circular aperture 358, and a spaced apart and generally parallel second bracket 360 having a generally circular aperture 362 that is attached to the shelf 354. The apertures 358 and 362 are coaxially aligned with one another. The first bracket 356 may form part of the first or second support member 270 or 272. A tab 364 extends outwardly at a right angle to the second bracket 360. A locking mechanism 366 is attached to the tab 364.

The storage receptacle 352 includes a first bracket 372 having an aperture 374 and a second bracket 376 having an aperture 378. The brackets 372 and 374 are attached to the support member and the base plate 304. The second bracket 376 includes a tab 380. A locking mechanism 382 is attached to the tab 380. The apertures 374 and 378 are coaxially aligned with one another. The first bracket 372 and second bracket 376 are spaced apart and parallel to one another such that a twist lock 314 may be disposed therebetween with the bore 330 of the twist lock 314 aligned coaxially with the apertures 374 and 378.

The locking mechanism 382, as shown in FIGS. 26–29, is identical to the locking mechanism 366. The locking mechanism 382 includes a hollow threaded shank 386 adapted to be attached to the tab 380. A spring biased plunger 388 is disposed in the shank 386. A generally L-shaped handle 390 is attached to the plunger 388. The plunger 388 is extended by rotating the handle 390 such that the handle is received in a slot 392 in the body of the locking mechanism 382. The plunger 388 is retracted by pulling the handle 390 out of the slot 392 and rotating the handle about the axis of the plunger 388 such that the handle 390 engages the end of the body of the locking mechanism 382 as shown in FIGS. 26 and 27.

In operation, when a twist lock 314 is to be stored, the twist lock 314 is placed in the storage receptacle 352 by locating the housing 316 between the first bracket 372 and second bracket 376 such that the bore 330 is coaxially aligned with the apertures 374 and 378. The pin 396 is then inserted through the aperture 378, bore 330 and aperture 374 such that the head of the pin 396 is located adjacent the second bracket 376. The pin 396 thereby connects the twist lock 314 to the storage receptacle 352. The plunger 388 of the locking mechanism 382 is then extended such that the head of the pin 396 will engage the plunger 388 to prevent unintended axial removal of the pin 396 from the storage receptacle 352. The plunger 388 can be manually retracted to allow removal of the pin 396 and thereby the removal of the twist lock 314 from the storage receptacle 352.

FIGS. 23–25 show the sequence of steps involved in attaching a twist lock 314 to the mounting receptacle 398 of a CROP 30. The receptacle 398 includes an aperture 400. The CROP 30 includes a mounting receptacle 398 in each of its four corners. The aperture 400 is generally elongate and rectangular or oblong and is adapted to receive the head 344 and shear block 342 of the twist lock 314. As show in FIG. 23, the head 344 of the twist lock 314 and shear block 342 are inserted into the aperture 400 of the mounting receptacle 398. As shown in FIG. 24, the shear block 342 is located within the aperture 400 and the head 334 is located inwardly of the aperture 400. The housing 316, shaft 332 and head 334 are then rotated approximately ninety degrees about the axis 338 to a position as shown in FIG. 25 while the shear block 342 remains stationary. The wing members 336 of the head 334 extend outwardly beyond the aperture 400 when in the locked position as shown in FIG. 25 to prevent removal of the twist lock 314 from the mounting receptacle 398. The twist lock 314 can be removed from the mounting receptacle 398 of the CROP 30 in a reverse manner by rotating the housing 316 and head 334 approximately ninety degrees such that the head 334 is aligned with the shear block 342 as shown in FIG. 24. The head 334 will then pass through the aperture 400 of the mounting receptacle 398.

When it is desired to load a CROP 30 and its cargo 32 onto the pallet 200, a twist lock 314 is attached to each mounting receptacle 398 of the CROP 30. The CROP 30 and cargo is then loaded onto the pallet 200. The twist locks 314 are lowered into their respective mounting receptacles 350 in the pallet 200 such that each twist lock 314 is located between the first bracket 356 and second bracket 360 of a mounting receptacle 350. The inclined wall 328 of the housing 316 will engage the edge of the top plate 308 and support members 270 or 272 to assist in directing the twist lock 314 into the mounting receptacle 350. When located in the mounting receptacle 350, the bore 330 of the twist lock 314 is aligned with the apertures 358 and 362. The pin 396 is then inserted through the aperture 362, bore 330 and aperture 358 to thereby lock the twist lock 314 to the pallet 200, and thereby lock the CROP 30 and cargo 32 to the pallet 200. The plunger of the locking mechanism 366 is then extended to prevent inadvertent removal of the pin 396, receptacle 350 and the twist lock 314. The CROP 30 and cargo 32 can be removed from the pallet 200 in reverse manner.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A pallet for securing a container roll-in/out platform within an aircraft by an aircraft cargo handling system, said pallet including:

a base adapted to be secured within the aircraft by the cargo handling system;

a plurality of lock members, each said lock member adapted to be removably secured to the platform;

a plurality of mounting receptacles attached to said base, each said mounting receptacle adapted to removably receive and retain a respective lock member in an operational position such that said lock member is adapted to removably secure the platform to said base; and a plurality of storage receptacles attached to said base, each said storage receptacle adapted to removably receive and retain a respective lock member in a stored non-operational position;

whereby said lock members are selectively retained in said mounting receptacles to enable said lock members to removably secure the platform to said base, and said lock members are selectively retained in said storage receptacles to enable said lock members to be stored in a non-operational position.

2. The pallet of claim 1 wherein said base includes a first support member and a second support member extending between a first end rail and a second end rail, said support members adapted to support the platform.

3. The pallet of claim 1 wherein each said support member includes one or more openings adapted to receive the forks of a fork lift truck.

4. The pallet of claim 1 wherein each said lock member includes an inclined side wall adapted to assist in directing the lock member into a mounting receptacle.

5. The pallet of claim 1 including a plurality of locking pins, and wherein each said storage receptacle includes a first bracket and a second bracket, each said bracket including a respective aperture, said locking pin adapted to be inserted through said apertures of said brackets to mount said lock member to said storage receptacle.

6. The pallet of claim 1 wherein each said lock member includes a housing having a bore and a locking pin adapted to be inserted into said bore, said locking pin adapted to mount said lock member to one of said mounting receptacles.

7. The pallet of claim 6 wherein each said mounting receptacle includes a first bracket having a first aperture and a second bracket having a second aperture, said locking pin adapted to be inserted through said first and second apertures of said brackets and through said bore of said housing of said lock member to secure said lock member to said mounting receptacle.

8. The pallet of claim 7 wherein each said mounting receptacle includes a locking mechanism to prevent inadvertent removal of said locking pin from said mounting receptacle.

9. The pallet of claim 1 wherein each said lock member includes a housing, a head attached to said housing by a shaft, and a block extending around said shaft, said block adapted to be rotatable about said shaft with respect to said housing and said head, said head adapted to be inserted into the platform to secure the housing to the platform.

10. The pallet of claim 1 including a plurality of tabs located on each side of said base, said tabs adapted to engage the aircraft cargo handling system.

11. The pallet of claim 1 wherein each said lock member includes:
- a housing including a top wall, a front wall and a rear wall;
- a shaft having a first end and a second end, said first end of said shaft attached to said top wall of said housing;
- a head attached to said second end of said shaft; and
- a block extending around said shaft between said top wall of said housing and said head, said block adapted to be rotatable about said shaft with respect to said housing and said head.

12. The pallet of claim 11 wherein said housing includes a bottom wall and an inclined wall extending between said front wall of said housing and said bottom wall.

13. The pallet of claim 11 wherein said housing includes a bore extending through said housing from said front wall to said rear wall.

14. The parallel of claim 11 wherein said head includes a first wing member and second wing member extending outwardly from said shaft.

* * * * *